United States Patent [19]

Engel

[11] 4,031,975

[45] June 28, 1977

[54] MECHANICAL MULTIPLIER FOR THE PURPOSE OF SPEED AND STEERING CONTROL FOR HYDROSTATIC SYSTEM

[75] Inventor: William K. Engel, Peoria, Ill.

[73] Assignee: Caterpillar Tractor Co., Peoria, Ill.

[22] Filed: Jan. 21, 1976

[21] Appl. No.: 650,832

[52] U.S. Cl. .............................................. 180/6.48
[51] Int. Cl.² ........................................ B62D 11/04
[58] Field of Search ............... 180/6.48, 6.32, 6.36; 74/471 R, 479, 480 R, 481, 482; 60/420; 91/418

[56] References Cited

UNITED STATES PATENTS

| | | | |
|---|---|---|---|
| 3,362,493 | 1/1968 | Davis | 180/6.48 X |
| 3,500,633 | 3/1970 | Livezey | 180/6.48 X |
| 3,504,493 | 4/1970 | Potter | 180/6.48 X |

Primary Examiner—Joseph F. Peters, Jr.
Assistant Examiner—R. Schrecengost
Attorney, Agent, or Firm—Phillips, Moore, Weissenberger Lempio & Majestic

[57] ABSTRACT

The invention is concerned with an improvement in a control system for a hydrostatic drive of a vehicle comprising a pair of hydrostatic pumps the output of each of which is adjustable by moving an arm attached to a servo valve controlling the displacement of said pumps, each pump powering a respective hydraulic motor which drives a respective ground engaging means of said vehicle. The improvement of the present invention mechanically controls the speed and steering functions of the system. It comprises a pair of adjusting means, one communicating with each of the pumps, each comprising a frame adjacent the pump, a first crank mounted centrally to the frame, a first end of the first crank drivingly linked to the arm; a second crank mounted centrally to the frame, a first end of the second crank drivingly linked to a second end of the first crank and a third crank mounted centrally to the frame, a first end of the third crank drivingly linked to the second end of the first crank and a second end of the third crank drivingly linked to steering linkage means. The improved arrangement further includes tying means drivingly mounted adjacent a second end of each of the second cranks linking movement thereof.

7 Claims, 2 Drawing Figures

MECHANICAL MULTIPLIER FOR THE PURPOSE OF SPEED AND STEERING CONTROL FOR HYDROSTATIC SYSTEM

BACKGROUND OF THE INVENTION

1. Field of the Invention

The invention is concerned with control systems for the hydrostatic drive of a vehicle. More particularly the invention is concerned with an improved mechanical arrangement for controlling the speed and steering functions of the control system of a hydrostatically driven vehicle. Typically such a vehicle will be driven by ground engaging means as for example by an endless track or by tires. Full control of both speed and steering is provided by the mechanical arrangement of the present invention.

2. Prior art

The prior art has been primarily concerned with hydraulically controlling speed and steering functions of a hydrostatic control system. Such systems are more costly to manufacture than an all mechanical arrangement. Further, good steering modulation through the use of hydraulic cylinders is harder to obtain than with a mechanical arrangement. Really satisfactory steering modulation has never been fully attained with the use of hyraulic cylinders. Still further a hydraulic system is somewhat less reliable than a purely mechanical arrangement, requires the use of more space, and is generally more costly to repair.

Accordingly the present invention is concerned with providing a unique and positive acting mechanical arrangement for controlling the speed and steering functions to be infinitely variable within selected limits in a control system for a hydrostatic drive of a vehicle. The arrangement of the present invention provides positive and infinitely variable steering and in fact provides a capability for spot turning as by having a different direction of rotation for the ground engaging means on each side of a vehicle.

SUMMARY OF THE INVENTION

The present invention comprises an improved arrangement for controlling the speed and steering functions of a control system for a hydrostatic drive of a vehicle. Such a control system comprises a pair of hydrostatic pumps the output of each of which is adjustable by moving an arm attached to a servo valve controlling the displacement of said pumps, each pump powering a respective hydraulic motor which drives a respective ground engaging means of the vehicle. The improved arrangement controls the speed and steering functions of the system. It comprises a pair of adjusting means, one communicating with each of said pumps. Each of the adjusting means comprises a first crank mounted centrally to a frame adjacent said pump, a first end of said first crank drivingly linked to said arm; a second crank mounted centrally to said frame, a first end of said second crank drivingly linked to a second end of said first crank; and a third crank mounted centrally to said frame, a first end of said third crank drivingly linked to said second end of said first crank and a second end of said third crank drivingly linked to steering linkage means. The mechanical arrangement further includes tying means drivingly mounted adjacent a second end of each of said second cranks linking their movement.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENT

Figure 1:
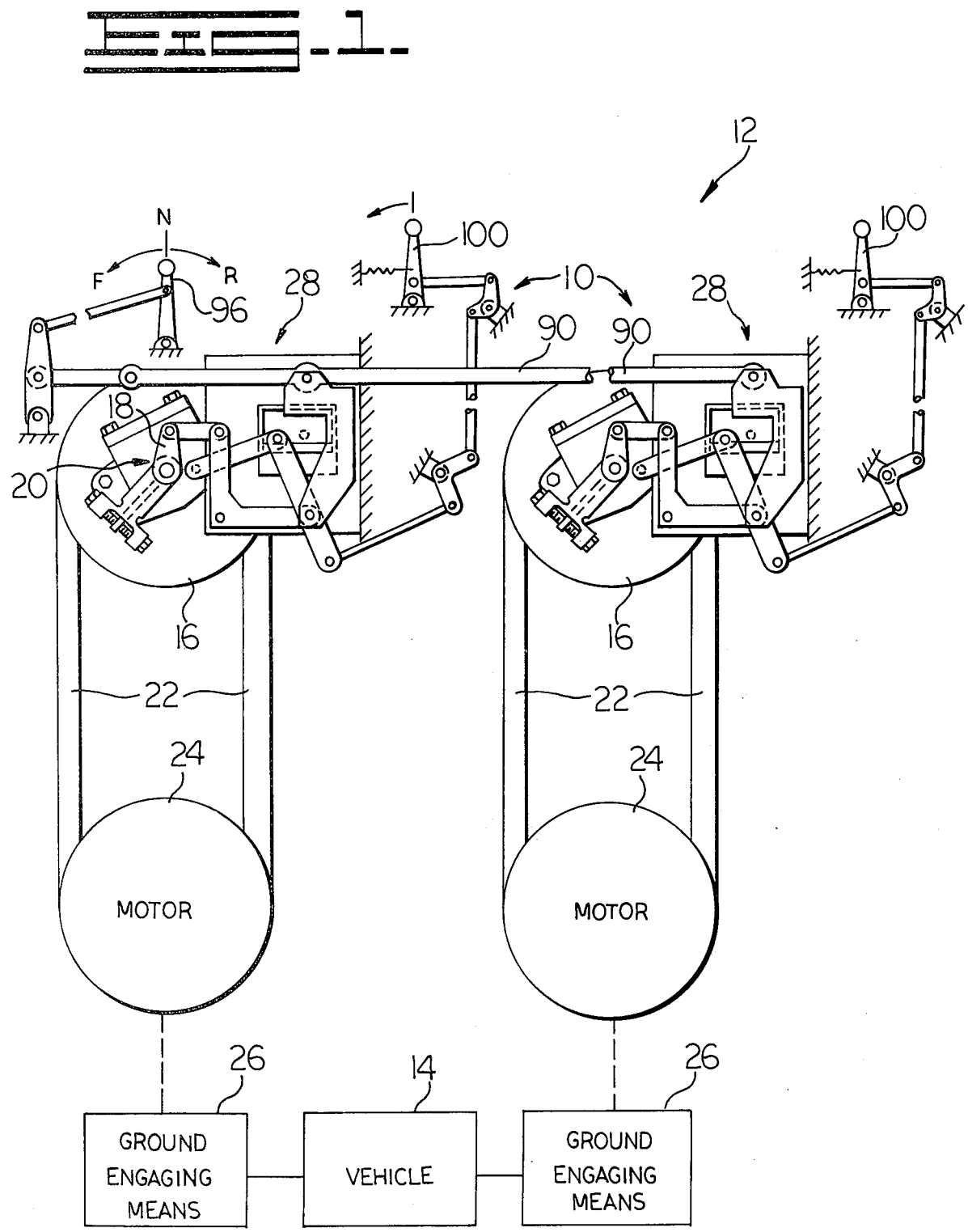
FIG. 1 illustrates, partially in schematic, a control system of the present invention including the improved arrangement of the present invention for controlling the speed and steering functions thereof with the system being in the neutral position.

In FIG. 1 there is illustrated a control system 10 for a hydrostatic drive 12 of a vehicle 14. The hydrostatic drive 12 includes a pair of hydrostatic pumps 16 the output of each of which is adjusted by moving an arm 18 attached to a servo valve 20 which controls the displacement of the pump 16. The particular servo valve 20 illustrated is controlled by rotation of the arm 18. It is to be understood that the invention is not limited to rotary operated servo valves but is equally useful with linearly operated servo valves (valves wherein linear movement of an arm such as 18 controls the displacement of a pump such as 16). Hydraulic fluid is pumped by the pumps 16 via conduit means 22 to and from a pair of hydrostatic motors 24 which each drive respective ground engaging means 26 of the vehicle 14. It is clear that one of the motors 24 drives one of the ground engaging means 26 and the other of the motors 24 drives the other of the ground engaging means 26. For example, the left hand motor 24 of FIG. 1 can be thought of as driving the left hand track of an earth working machine and the right hand motor 24 can be thought of as driving the right hand track 26 of said earth working machine.

Figure 2:
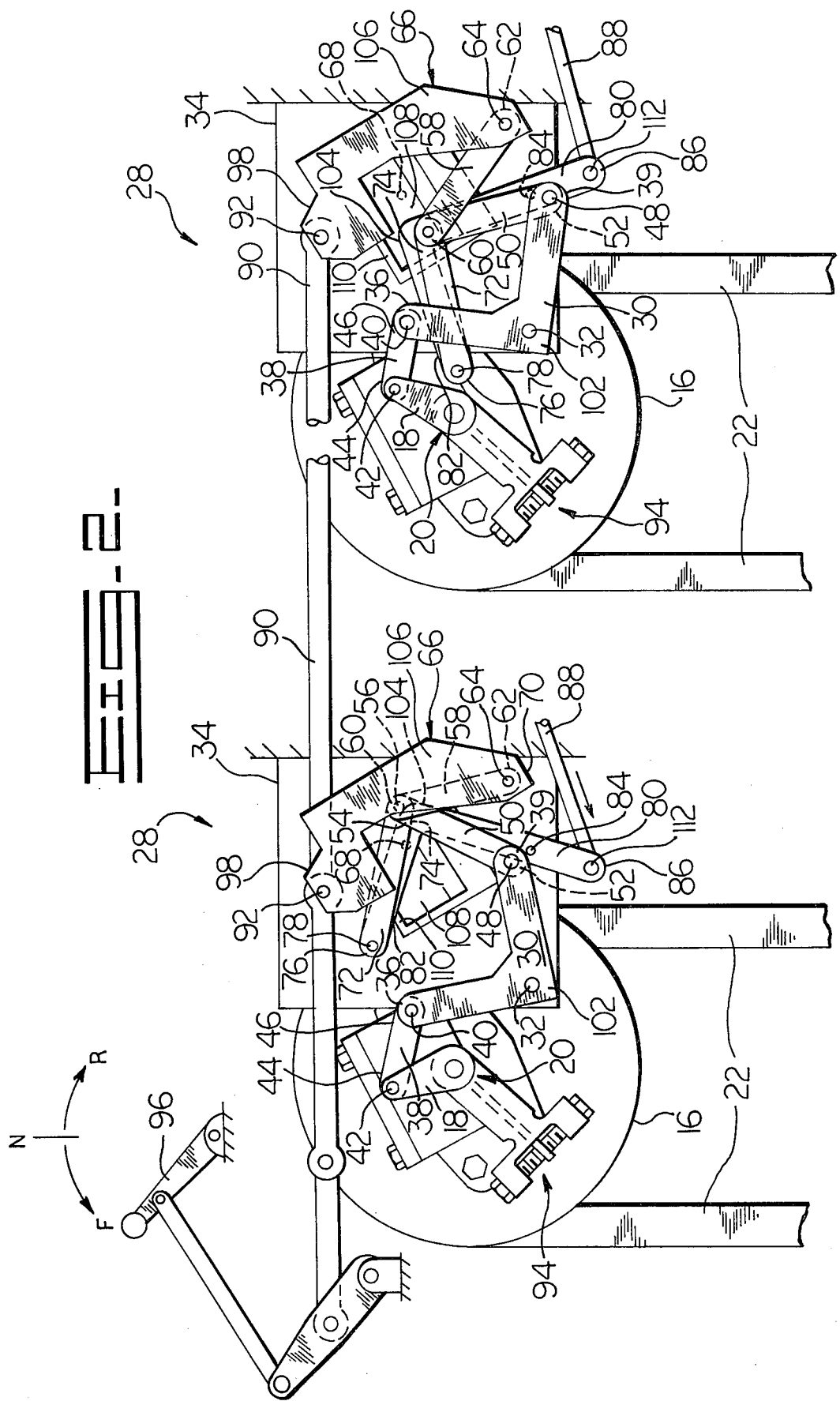
FIG. 2 is an enlarged view illustrating the mechanical arrangement of the present invention with the vehicle being adjusted for forward motion.

Turning now particularly to the control system 10 and primarily to FIG. 2 it will be seen that the control system 10 comprises a pair of adjusting means 28, one communicating with each of the pumps 16. Each of the adjusting means 28 may be seen to comprise a first crank 30 mounted centrally at a first pivot 32 to a fixed frame 34 adjacent the pump 16. A first end 36 of the first crank 30 is drivingly linked via a first link 38 at a first floating pivot 40 to the arm 18. A second end 39 of the first crank 30 is linked as explained below. The arm 18 is pivotally attached at a second floating pivot 42 to a first end 44 of the first link 38. The first floating pivot 40 thus serves to attach a second end 46 of the first link 38 to the first end 36 of the first crank 30.

The first crank 30 is pivotally attached at a third floating pivot 48 to linking means, more particularly to a second link 50 and still more particularly to a first end 52 of second link 50. A second end 54 of the second link 50 is pivotally attached at a fourth floating pivot 56 to third link means, namely a third link 58 at a first end 60 thereof. A second end 62 of the third link 58 is attached at a fifth floating pivot 64 to a second crank 66. The second crank 66 is mounted generally centrally to the frame 34 at a second fixed pivot 68. The third link 58 is thus drivingly linked at its second end 62 to a first end 70 of the second crank 66.

Fourth link means, namely a fourth link 72 is drivingly mounted adjacent a first end 74 thereof adjacent the second end 54 of the second link 50 and the first end 60 of the third link 58 at the fourth floating pivot 56. A second end 76 of the fourth link 72 is then pivotally drivingly attached as by a sixth floating pivot 78 to a third crank 80 and more particularly adjacent a first end 82 thereof. The third crank 80 pivots about a third fixed pivot 84 as illustrated. Thus, the third crank 80 is mounted generally centrally to the frame 34 by the third fixed pivot 84. Further, the first end 82 of the third crank 80 is drivingly linked to the second end 39 of the first crank 30 via second link 50 and fourth link 72. A second end 86 of the third crank 80 is drivingly linked to steering linkage means, for example to a rod 88.

Tying means, in the embodiment illustrated a tie rod 90 is drivingly mounted at a seventh floating pivot 92 of each of the second cranks 66 and provides co-ordinating movement of said second cranks 66.

Each of the servo valves 20 generally includes null adjusting means indicated generally at 94 to balance their output when a speed control lever 96 is in its neutral position. Movement of the speed control lever 96, as illustrated, causes movement of the tie rod 90 and corresponding movement of the two adjusting means 28. Alternately, the lever 96 may control a hydraulic cylinder which will then cause movement of the tie rod 90 and/or the tie rod 90 can be replaced by other equivalent tying means, e.g., by stacking the second cranks 66, between the pair of adjusting means 28. In the single embodiment shown, the tie rod 90 simply attaches to the seventh floating pivot 92 at a second end 98 of the second crank 66.

Control of the steering function of the control system 10 is provided by a pair of steering levers 100 each of which communicate via conventional linkages with the rod 88 of a respective one of the pair of adjusting means 28. The steering levers 100 can be hand operated or if desired can be pedal operated. Further, if desired, the levers 100 can be linked to the rod 88 via hydraulic cylinder means or the like.

As will be noted by examination of the embodiment illustrated in the figures of the drawings and more particularly by examination of FIG. 2, the first crank 30 is generally V-shaped with an apex 102 defined by the joining of the legs thereof aiming generally towards the pump 16. Further, the third crank 80 is also generally V-shaped with an apex 104 thereof defined by the joining of the legs thereof aiming generally away from said pump 16.

In the preferred embodiment of the invention the second crank 66 includes a first generally planar portion 106, a second generally planar portion 108 and interconnecting means, for example the structure 110 rigidly affixing the first portion 106 and the second portion 108 to one another a spaced distance apart. It is clear that it is the second portion 108 which is pivotally mounted to the frame 34 at the second fixed pivot 68. Each of the second, third and fourth links, 50, 58, and 72 and the first andd third cranks 30 and 80 are positioned between a first plane defined by said first portion 106 and a second plane defined by said second portion 108. It is further clear that in the preferred embodiment of the invention the third link 58 is next adjacent the first portion 106 followed by the second link 50 then by the fourth link 72 and then by the third crank 80. Further, the first crank 30 is generally coplanar with the third link 58. Somewhat more generally, the links and cranks are so sized and so disposed that when crank 66 is in its centered or neutral position, pivots 48, 64 and 84 are coaxial; similarly, when crank 80 is in its centered position, pivot 68 and dual pivot 56 are coaxial. This structure provides a compact yet easy to repair and easy to adjust mechanism.

OPERATION

The operation of the improved mechanical arrangement of the present invention will be best understood by reference to FIGS. 1 and 2 considered together. FIG. 1 illustrates the entire mechanical arrangement with the speed control lever 96 in the neutral position and FIG. 2 illustrates a portion of the arrangement with the speed lever 96 thrown in the forward direction.

Referring particularly to the right hand side of FIG. 2, when the speed lever 96 is thrown from the neutral position to the forward position, this results in the second end 98 of the second crank 66 being moved leftwardly. The second crank 66 then rotates about the second fixed pivot 68 whereby the first end 70 of the second crank 66 is forced rightwardly. With this movement, the third link 58 and more particularly the second end 62 thereof is pulled rightwardly by the action of the fifth floating pivot 64. This in turn leads to a downward and rightward movement of the first end 60 of the third link 58 and, via the second link 50 and the fourth floating pivot 56 along with the third floating pivot 48, to a downward movement of the second end 39 of the first crank 30. Since the first crank 30 is fixed pivotally mounted at the first fixed pivot 32 to the frame 34, the first end 36 of the first crank 30 is pivoted generally rightwardly whereby it exerts a pulling force via the first floating pivot 40 to a second end 46 of the first link 38. This in turn exerts a rightward pulling force and more particularly a clockwise rotation to the arm 18 which is linked to the first end 44 of the first link 38 by the second floating pivot 42. Thus a clockwise rotation of the arm 28 leads to increased flow of fluid within the conduit means 22 in a direction such that the motor 24 will force the ground engaging means 26 to turn in such a direction as to drive the vehicle 14 forwardly. Movement of the speed control lever 96 in the reverse direction will cause a counter clockwise movement of the arm 18 and thus cause the ground engaging means 26 to drive the vehicle 14 in a reverse direction.

Referring now particularly to FIG. 2 it will be noted that the left hand portion thereof illustrates a movement of the rod 88 in the direction indicated by the arrow. This is equivalent to throwing the steering lever 100 leftwardly. What results in that the third crank 80 has its second end 86 forced generally leftwardly since the rod 88 is pivotally mounted to the second end 86 of the third crank 80 at an eight floating pivot 112. This in turn causes a rotation of the third crank 80 about the third fixed pivot 84 with a corresponding rightward movement of the fourth link 72 which is pivoted at the sixth floating pivot 78 with its second end 76 attached to the first end 82 of the third crank 80. As a result of the movement of the fourth link 72 rightwardly, its first end 74 is likewise thrown rightwardly and because of the linkage at the fourth floating point 56, the second end 54. of the second link 50 is propelled rightwardly and upwardly thus forcing the first end 52 of the second link 50 upwardly. The first end 52 of the second link 5o thus pulls via the third floating pivot 48 upwardly upon the second end 39 of the first crank 30 whereby the first crank 30 is rotated. about the first fixed pivot 32 thus causing the first end 36 of the first crank 30 to push upon the second end 46 of the first link 38 and propel said first link 38 leftwardly. As a result of the leftward movement of the first link 38, the first end 44 thereof acting through the second floating pivot 42 causes the arm 18 to rotate in a counter clockwise direction. This then leads to less forward motion in the left hand ground engaging means 26 or may even lead to reverse movement of the left hand of the ground engaging means 26. What results is then a turn to the left since the right hand ground engaging means 26 is moving faster than the left hand ground engaging means 26. If the left hand ground engaging means 26 is forced far enough in a reverse direction then what can result is a spot turn of the vehicle since the right hand ground engaging means 26 will be moving in a forward direction while the left hand ground engaging means 26 will be moving in a reverse direction.

While the invention has been described in connection with specific embodiments thereof, it will be understood that it is capable further modification, and this application is intended to cover any variations, uses or adaptations of the invention following, in general, the principles of the invention and including such such departures from the present disclosure as come within known or customary practice in the art to which the invention pertains and as may be applied to the essential features hereinbefore set forth, and as fall within the scope of the invention and the limits of the appended claim.

What is claimed is:

1. In a control system for a hydrostatic drive of a vehicle comprising a pair of hydrostatic pumps the output of each of which is adjustable by moving an arm attached to a servo valve controlling the displacement of said pumps, each pump powering a respective hydraulic motor which drives a respective ground engaging means of said vehicle, an improved mechanical arrangment for controlling the speed and steering functions of said system, comprising:
    A. a pair of pump adjusting means, one communicating with each of said pumps, each adjusting means comprising:
       1. a first crank mounted centrally thereof to a frame adjacent said pump, a first end of said first crank drivingly linked to said arm;
       2. a second crank mounted centrally thereof to said frame, a first end of said second crank drivingly linked to a second end of said first crank; and
       3. a third crank mounted centrally thereof to said frame, a first end of said third crank drivingly linked to said second end of said first crank and a second end of said third rank drivingly linked to independent steering linkage means;
    B. a pair of independent operator adjustable steering means, each respective one of said pair of steering means operatively connected to move a respective one of said pair of independent steering linkage means; and
    C. tying means drivingly mounted adjacent a second end of each of said second cranks linking their movement.

2. In a control system for a hydrostatic drive of a vehicle comprising a pair of hydrostatic pumps the output of each of which is adjustable by moving an arm attached to a servo valve controlling the displacement of said pumps, each pump powering a respective hydraulic motor which drive the respective ground engaging means of said vehicle, an improved arrangement for controlling the speed and steering functions of said system, comprising:
    A. a pair of adjusting means, one communicating with each of said pumps, comprising:
       1. first link means drivingly mounted adjacent a first end thereof to said arm;
       2. a first crank drivingly mounted adjacent a first end thereof to adjacent a second end of said first link means;
       3. second link means drivingly mounted adjacent a first end thereof adjacent a second end of said first crank;
       4. third link means drivingly mounted adjacent a first end thereof adjacent a second end of said second link means;
       5. a second crank drivingly mounted adjacent a first end thereof adjacent a second end of said third link means;
       6. fourth link means drivingly mounted adjacent a first end thereof adjacent said second end of said second link means and said first end of said third link means;
       7. a third crank drivingly mounted adjacent a first end thereof adjacent a second end of said fourth link means; and
       8. independent steering linkage means drivingly mounted adjacent a second end of said third crank;
       9. each of said cranks being pivotally mounted intermediate its ends to fixed frame means;
    B. a pair of independent operator adjustable steering means, each respect of one of said pair of steering means operatively connected to move a respective one of said pair of said steering linkage means; and
    C. tying means drivingly mounted adjacent a second end of each of said second cranks linking movement thereof.

3. An improved arrangement as in claim 2, wherein said first crank is generally V-shaped with an apex defined by the joining of the legs thereof aiming generally towards said pump, and said third crank is generally V-shaped with an apex defined by the joining of the legs thereof aiming generally away from said pump.

4. An improved arrangement as in claim 3, wherein said second crank includes a first generally planar portion, a second generally planar portion generally parallel to and spaced from said first portion and inerconnecting means rigidly affixing said first and second portions to one another, said second portion is pivotally mounted to said frame means and each of said second, third and fourth link means and said first and third cranks are positioned between a first plane defined by said first portion and a second plane defined by said second portion.

5. An improved arrangement as in claim 4, wherein said third link means is next adjacent said first portion followed by said second link means, then by said fourth link means and then by said thid crank.

6. An improved arrangement as in claim 5, wherein said first crank is generally coplanar with said third link means.

7. An improved arrangement as in claim 6, wherein each of the driving mounts of each of said links and of each of said cranks comprises a pivotal mount.

* * * * *